United States Patent

Yamashita et al.

[11] Patent Number: 5,829,281
[45] Date of Patent: Nov. 3, 1998

[54] HANDLE LOCK DEVICE

[75] Inventors: Akihiko Yamashita; Yoshiyuki Nakajima; Yoshifumi Mochizuki, all of Saitama, Japan

[73] Assignee: Honda Giken Kogyo Kabushiki Kaisha, Tokyo, Japan

[21] Appl. No.: 749,010

[22] Filed: Nov. 14, 1996

[30] Foreign Application Priority Data

Nov. 14, 1995 [JP] Japan .................................. 7-295507

[51] Int. Cl.⁶ .................................................. B60R 25/02
[52] U.S. Cl. ............................... 70/183; 70/223; 70/387; 70/423
[58] Field of Search ............................. 70/183–186, 233, 70/252, 416, 419, 420, 423, 455, 387, 424, 427, 428, 453, 441, 360, 215–217, 223, 188, 189

[56] References Cited

U.S. PATENT DOCUMENTS

| 3,877,265 | 4/1975 | Shaumberg | 70/252 |
| 4,036,039 | 7/1977 | Nakanishi | 70/90 |
| 4,052,869 | 10/1977 | Weber | 70/252 |
| 4,981,026 | 1/1991 | Sakuno | 70/186 |
| 5,263,348 | 11/1993 | Wittwer | 70/379 R |
| 5,265,453 | 11/1993 | Konii | 70/379 R |
| 5,410,898 | 5/1995 | Shieh | 70/276 |
| 5,640,864 | 6/1997 | Miyamoto | 70/379 R |

FOREIGN PATENT DOCUMENTS 55-36678  8/1980  Japan .

*Primary Examiner*—Steven N. Meyers
*Assistant Examiner*—Gary Estremsky
*Attorney, Agent, or Firm*—Birch, Stewart, Kolasch & Birch, LLP

[57] ABSTRACT

A protector block is movable in a direction in which a key K can be inserted, and first engaging portions which engage each other when the protector block is pushed in are formed between the protector block and an outer lock cylinder. A crankshaft is movable in the direction in which the key K can be inserted, and second engaging portions which engage each other when the crankshaft is pushed in are formed between the crankshaft and the outer lock cylinder. When an object in place of a key is inserted into a key insertion hole and attempts are made to forcibly turn the object while pushing the object, the first engaging portions between the protector block and the outer lock cylinder engage each other, preventing the crankshaft from being turned. When attempts are made to turn an inserted object while pulling the object, the second engaging portions between the crankshaft and the outer lock cylinder engage each other, preventing the crankshaft from being turned. In combination with tumblers preventing the crankshaft from being turned, the above structure makes it highly difficult to unlock the handle lock device.

16 Claims, 7 Drawing Sheets

HANDLE LOCK DEVICE

BACKGROUND OF THE INVENTION

1. Field of the Invention

The present invention relates to a handle lock device for theft prevention for a motorcycle.

2. Description of Background Art

One conventional lock device for a cylinder is disclosed in Japanese Utility-model Publication No. Sho 55-36678 entitled "Lock Reinforcing Device for Cylinder Lock".

According to the above publication, as shown in FIG. 2, a projection is disposed on an inner cylinder of a cylinder lock, and a recess for receiving the projection is defined in an inner circumferential surface of an outer cylinder. The inner cylinder is urged outwardly by a spring to keep the outer and inner cylinders in engagement with each other.

When an unauthorized object or the incorrect key is inserted into the inner cylinder, attempts to turn the inner cylinder are resisted by engagement between a disk tumbler and the outer cylinder and also by engagement of the projection on the inner cylinder in the recess in the outer cylinder.

The lock device disclosed in the above publication prevents the inner cylinder from being forcibly turned by a key other than the correct key. The lock device is improved to resist attempts to turn the inner cylinder in an unlocking direction with a key of a different kind inserted into the inner cylinder. However, when attempts are made to turn the inner cylinder while it is being forcibly pushed in a key inserting direction, the inner cylinder is locked only by the disk tumbler as with lock devices prior to the above publication. Therefore, the conventional lock device remains to be improved from the standpoint of theft prevention.

SUMMARY AND OBJECTIONS OF THE INVENTION

It is an object of the present invention to provide a handle lock device which cannot be turned and unlocked even when an object in place of a key is inserted and attempts are made to forcibly turn the object while pushing the object or forcibly turn the inserted object while pulling the object.

To achieve the above object, a protector block is normally urged to move in a direction in which a key can be pulled out of a key insertion hole and a keyhole, and is movable in a direction in which the key can be inserted through the keyhole into the key insertion hole, the protector block having an engaging portion for engaging an outer lock cylinder when pushed in.

When an object in place of a key is inserted into the key insertion hole and attempts are made to forcibly turn the object while pushing the object, the engaging portion of the protector block engages the outer lock cylinder, and the protector block cannot be turned.

A crank portion of a crankshaft has an engaging portion disengageable from the outer lock cylinder when pushed in.

When attempts are made to turn an inserted object while pulling the object, the engaging portion of the crank portion of the crankshaft engages the outer lock cylinder, and the crankshaft cannot be turned.

The protector block is movable in a direction in which the key can be inserted through the keyhole into the key insertion hole. The protector block and the outer lock cylinder having therebetween first engaging portions engageable when the protector block is pushed in, and the crankshaft is movable in the direction in which the key can be inserted through the keyhole into the key insertion hole. The crankshaft and the outer lock cylinder having therebetween second engaging portions disengageable when the crankshaft is pushed in.

When an object in place of a key is inserted into the key insertion hole and attempts are made to forcibly turn the object while pushing the object, the first engaging portions between the protector block and the outer lock cylinder engage each other, preventing the crankshaft from being turned. When attempts are made to turn an inserted object while pulling the object, the second engaging portions between the crankshaft and the outer lock cylinder engage each other, preventing the crankshaft from being turned.

The engaging portion of the protector block extends in an axial direction thereof. Therefore, the protector block is not large in size in a radial direction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the drawings.

Figure 1:
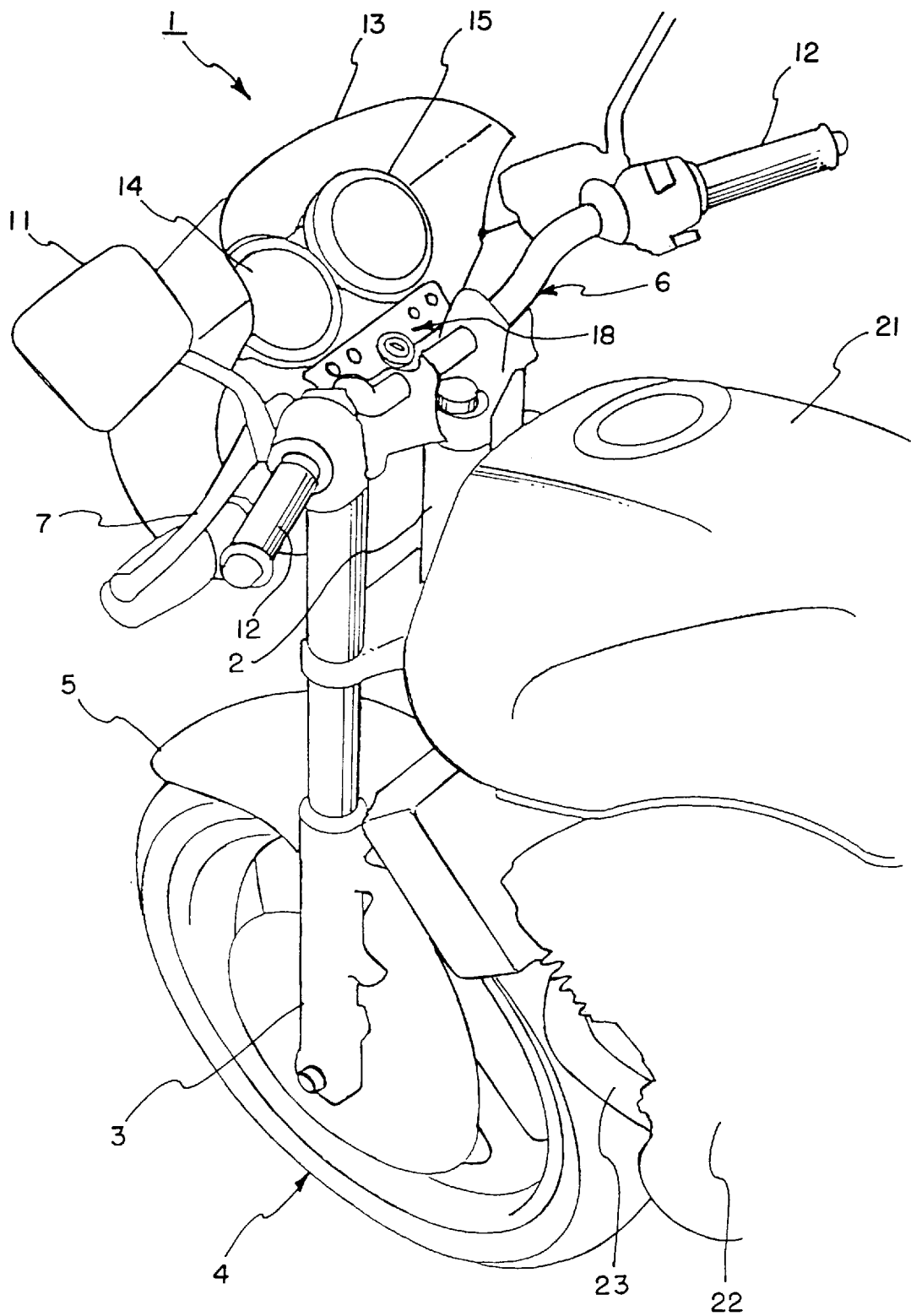
FIG. 1 is a perspective view of a front portion of a motorcycle having a handle lock device according to the present invention.

FIG. 1 is a perspective view of a front portion of a motorcycle having a handle lock device according to the present invention. The motorcycle 1 has a steering head 2 mounted on a front end of a frame (not shown). A front fork 3 is swingably mounted on the steering head 2 by a handle post (not shown). A front tire 4 is provided with a wheel mounted on an end of the front fork 3. A front fender 5 covers an upper portion of the front tire 4. A handle 6 is mounted on an upper end of the front fork 3 for turning the front fork 3 therewith. A clutch lever 7, a front brake lever (not shown), and a pair of rearview mirrors 11, the right-hand review mirror is omitted from illustration, are installed on left- and right-hand portions of the handle 6. A pair of grips 12 are mounted on respective left- and righthand ends of the handle 6. A front windshield 13, a speedometer 14, a tachometer 15, and a main switch 18 are mounted on a front portion of the steering head 2 and are arranged successively in a rearward direction. The main switch 18 includes a handle lock device 16 (see FIG. 3). A fuel tank 21 is mounted on an upper portion of the frame behind the steering head 2. An engine 22 is mounted on the frame below the fuel tank 21. An exhaust pipe 23 extending from a front end of the engine 22.

Figure 2:
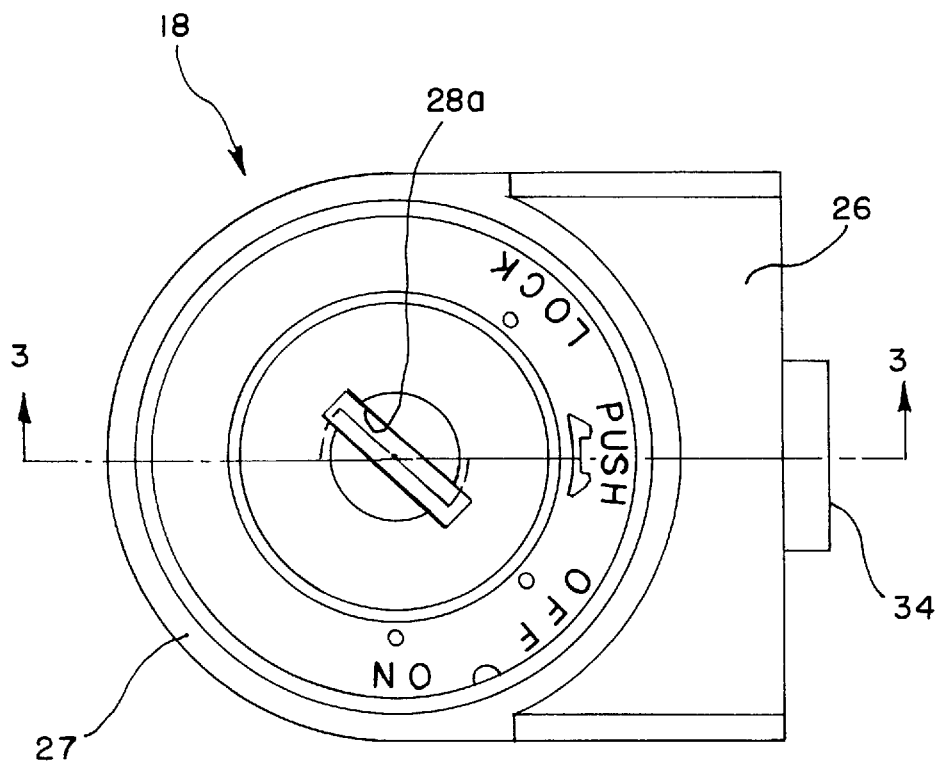
FIG. 2 is a plan view of a main switch which has the handle lock device according to the present invention.

FIG. 2 is a plan view of the main switch 18 which includes the handle lock device according to the present invention. The main switch 18 has a keyhole 28a defined in an upper surface thereof and indicia OFF, ON, PUSH, and LOCK are marked on the upper surface for indicating the positions to which a key K (see FIG. 4) can be turned.

When the keyhole 28a is in the OFF position, the engine 22 is not operated, and the handle 6 is unlocked. In the OFF position, the key K can be inserted into the keyhole 28a.

When the key K is turned to the ON position, the engine 22 is started, and the handle 6 remains unlocked.

To lock the handle 6, the handle 6 is fully turned to the left or right in FIG. 1, and then the key K is pushed into the keyhole 28a in the OFF position.

Thereafter, the key K is turned counterclockwise to the LOCK position. In the LOCK position, the key K is returned to an upper original position under upward biasing forces, whereupon the handle 6 is locked. The key K can be pulled out in the LOCK position.

Figure 3:
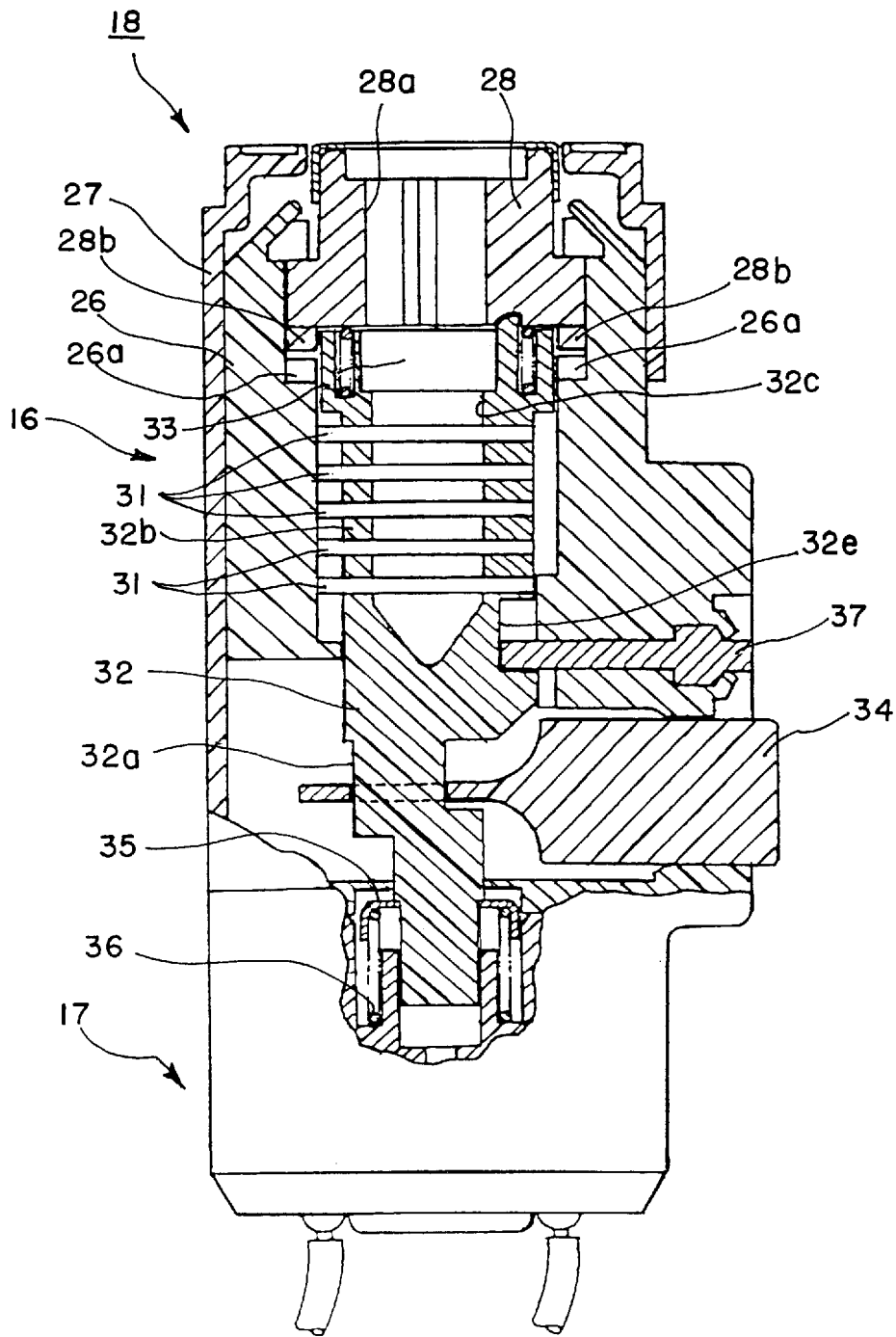
FIG. 3 is a cross-sectional view taken along line 3—3 of FIG. 2.

FIG. 3 is a cross-sectional view taken along line 3—3 of FIG. 2. In FIG. 3, the parts of the handle lock device are in the OFF position.

The main switch 18 comprises the handle lock device 16 in an upper portion thereof and an ignition switch unit 17 in a lower portion thereof.

The handle lock device 16 includes an outer lock cylinder 26 attached to a motorcycle base. A cover 27 covers the outer lock cylinder 26. A protector block 28 is angularly movable and vertically movably housed in an upper portion of the outer lock cylinder 26. The keyhole 28a is defined in the protector block 28. A crankshaft 32 is angularly movable and vertically movably housed in a lower portion of the outer lock cylinder 26 and includes a plurality of tumblers 31 which are retractable into a linear portion 32b above a crank portion 32a when the key K is inserted into a key insertion hole 32c that is defined in the linear portion 32b. A coil spring 33 is disposed in an annular groove 32d defined in an upper portion of the crankshaft 32 for normally urging the protector block 28 to move upwardly. A lock pin 34 can be brought into a locked or unlocked condition by the crank portion 32a of the crankshaft 32. A coil spring 36 normally urges the crankshaft 32 to move upwardly through a retainer 35. A control pin 37 is fixedly mounted in the outer lock cylinder 26 and includes a tip end inserted in a cam groove 32e defined in a side of the crankshaft 32, for limiting vertical and angular movement of the crankshaft 32.

The protector block 28 has teeth 28b projecting on a lower surface thereof for engaging in respective recesses 26a that are defined in the outer lock cylinder 26.

Figure 4:
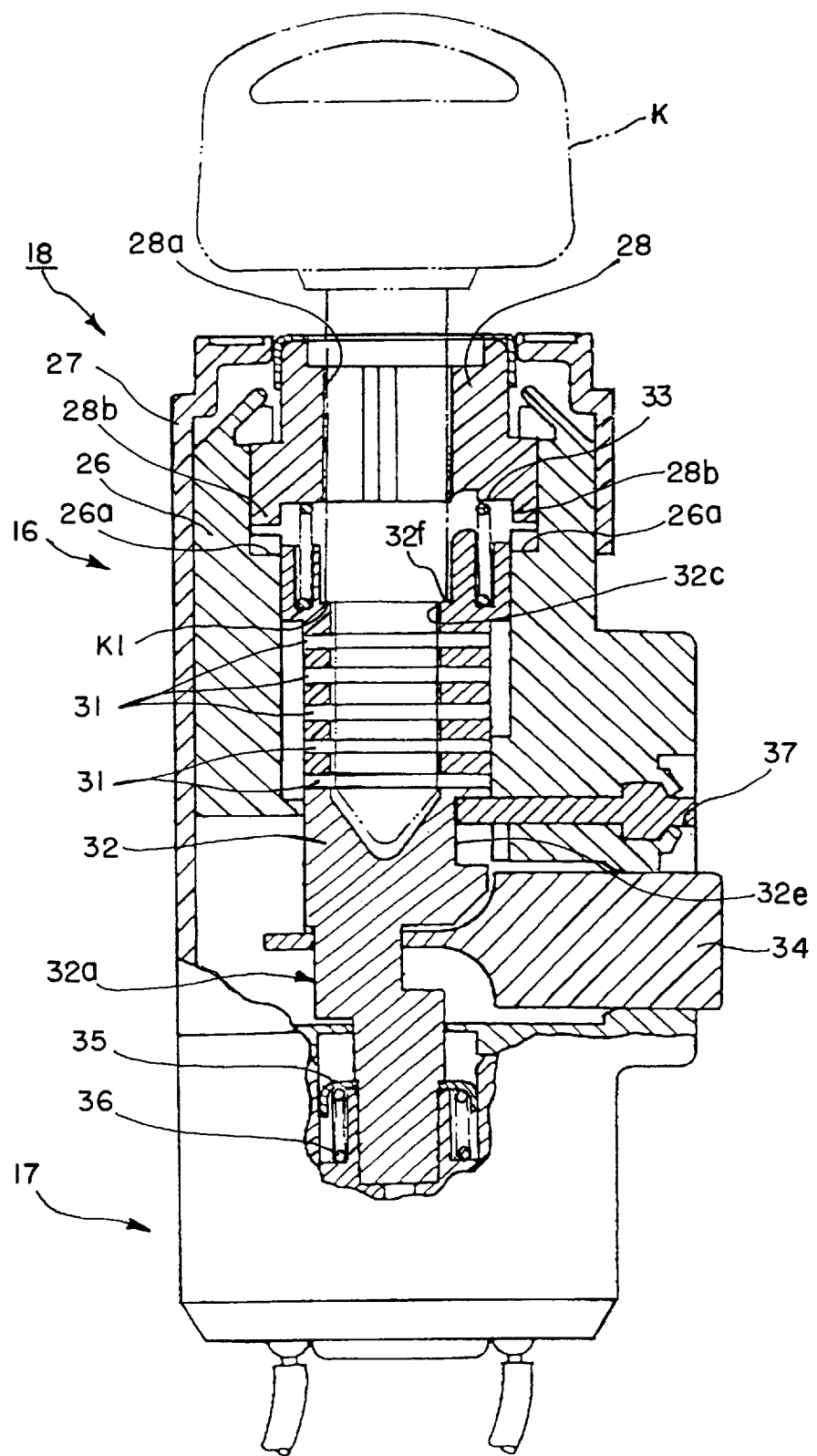
FIG. 4 is a cross-sectional view showing the parts of the handle lock device when a key is pushed thereinto in an OFF position.

Operation of the handle lock device 16 will be described below. FIG. 4 is a cross-sectional view showing the parts of the handle lock device 16 when the key K is pushed there into in the OFF position. For locking the handle 6, the key K is inserted through the keyhole 28a in the protector block 28 into the key insertion hole 32c in the crankshaft 32 in the OFF position. After a step K1 of the key K abuts against a key engaging portion 32f of the crankshaft 32, the key K is further pushed in against the upwardly biasing force of the coil spring 36, whereupon the crankshaft 32 is guided by the control pin 37 inserted in the cam groove 32e for angular movement to the LOCK position. The cam groove 32e will be described later on with reference to FIG. 7.

Figure 5:
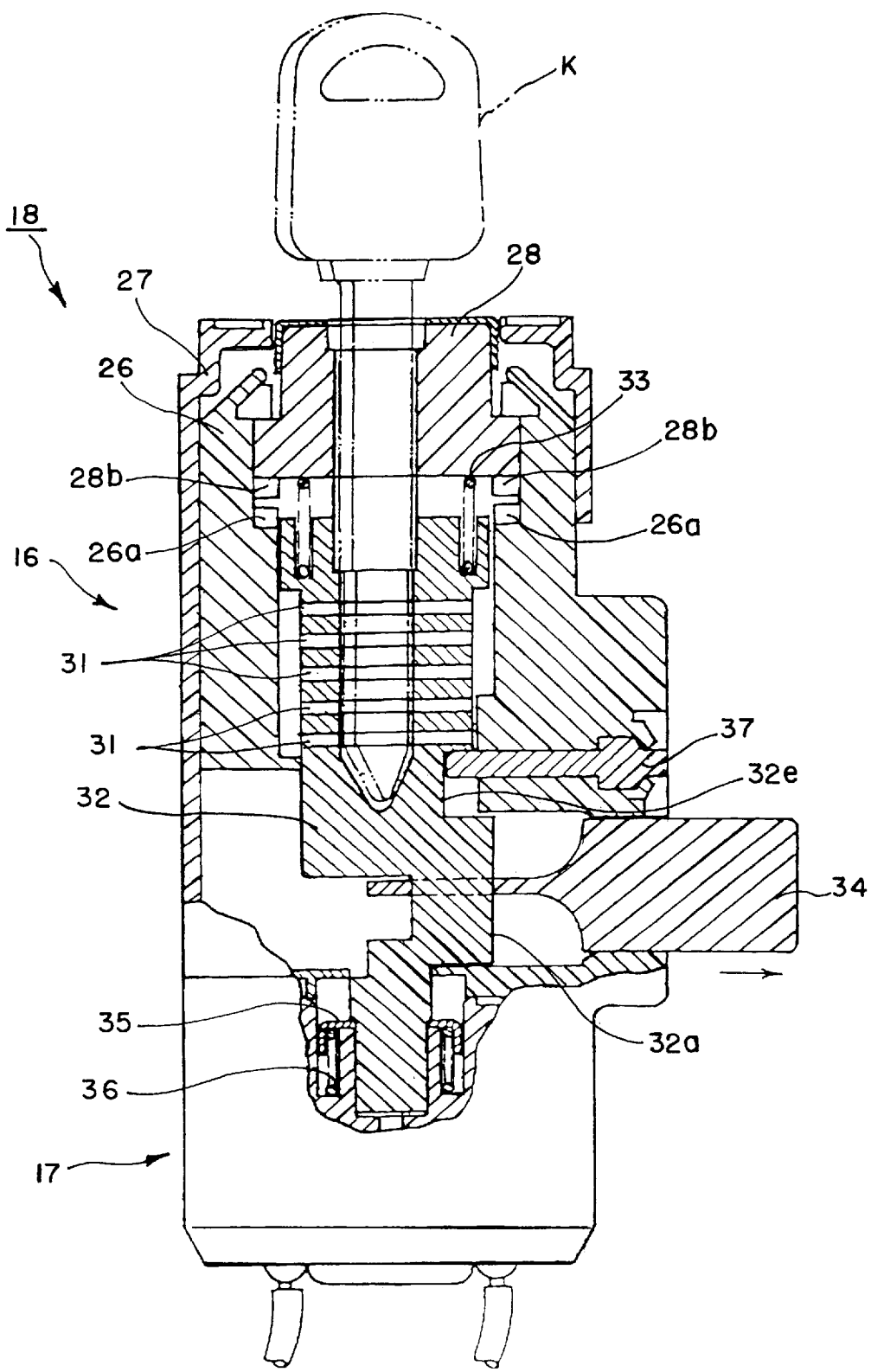
FIG. 5 is a cross-sectional view showing the parts of the handle lock device for thereby locking a handle.

FIG. 5 is a cross-sectional view showing the parts of the handle lock device 16 when the key K pushed in the OFF position is turned counterclockwise (see FIG. 2) to the LOCK position, for thereby locking the handle 6. Upon the angular movement of the key K, the crank portion 32a of the crankshaft 32 moves from the left to the right. The lock pin 34 with its end engaging the crank portion 32a also moves from the left to the right as indicated by the arrow in FIG. 5 and partly projects from the handle lock device 16.

Since the handle lock device 16 swings in unison with the handle 6, the lock pin 34 is fitted into a fitting portion (not shown) of the steering head 2 shown in FIG. 1, whereupon the handle 6 is locked. when the pushed key K is released from the pressure of an individual's hand, the key K is returned to its original height under the bias of the coil spring 36, and can be pulled out of the handle lock device 16.

Figure 6:
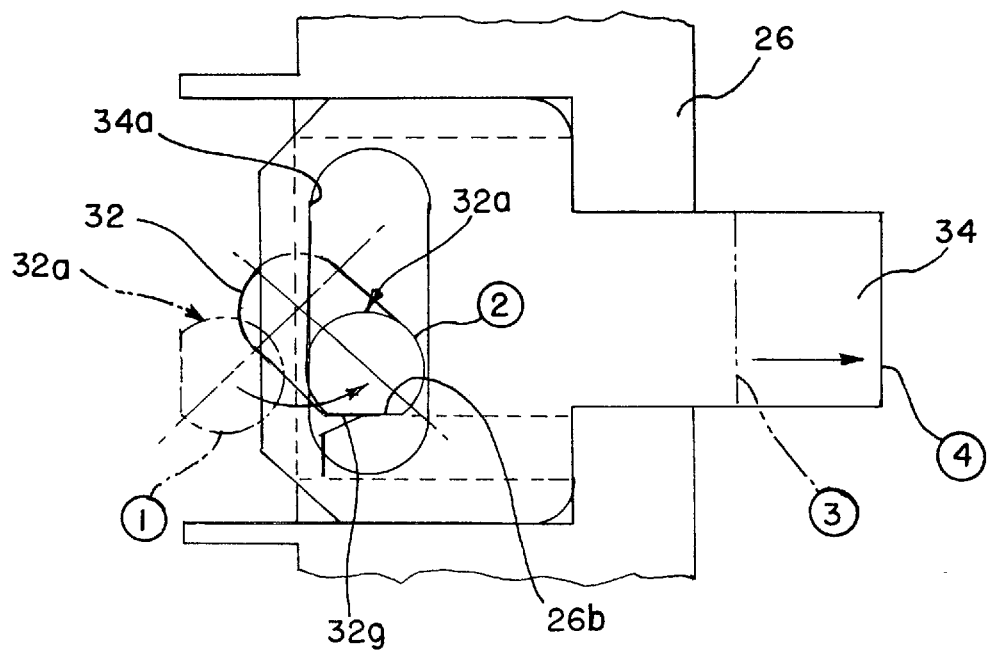
FIG. 6 is a plan view of a lock pin of the handle lock device.

FIG. 6 is a plan view of the lock pin 34 of the handle lock device 16. The crank portion 32a of the crankshaft 32 is loosely fitted in an oblong hole 34a defined in the end of the lock pin 34.

When the crankshaft 32 is turned, the crank portion 32a moves from a position (1) in the OFF position of the key K to a position (2) in the LOCK position of the key K, and the tip end of the lock pin 34 moves from a position (3) to a position (4) in unison with the crank portion 32a.

Figure 7:
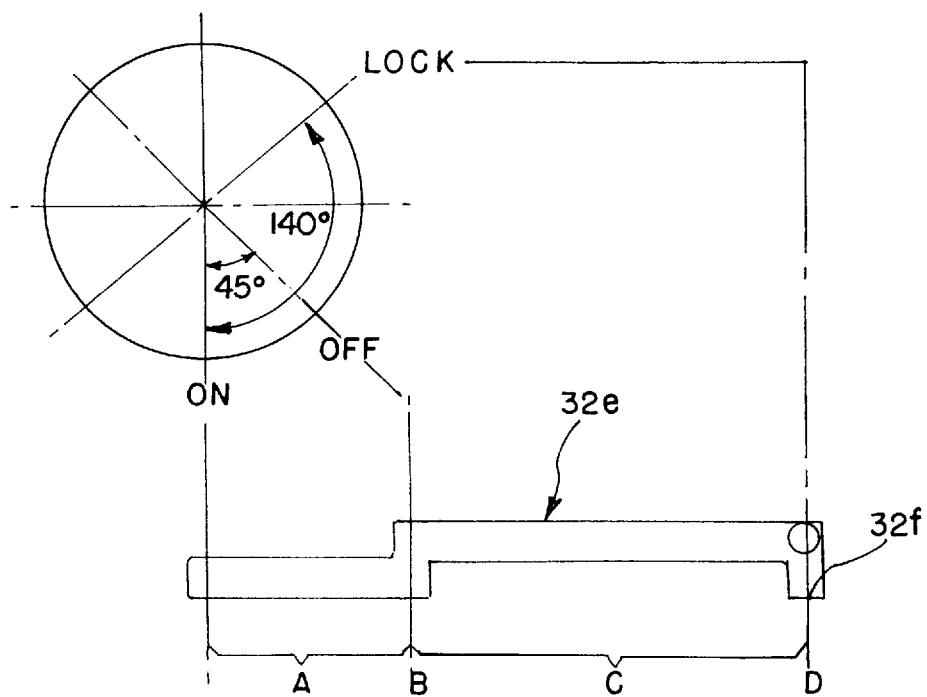
FIG. 7 is a developed view of a cam groove in a crankshaft of the handle lock device.

FIG. 7 is a developed view of the cam groove 32e in the crankshaft 32 of the handle lock device 16. Various positions in the circumferential direction of the cam groove 32e correspond respectively to the positions of the key K.

The cam groove 32e comprises a section A from the OFF position to the ON position, a section B at the OFF position, a section C from the OFF position to the LOCK position, and a section D at the LOCK position.

The section A is in a vertical position in which the control pin 37 slidably engages in the section A while the crankshaft 32 is not movable downwardly, i.e., the crankshaft 32 is in the vertical position shown in FIG. 3, when the key K is inserted into the protector block 28 and the crankshaft 32. The section A is used when the engine 22 is started.

The section C is in a vertical position in which the control pin 37 slidably engages in the section C while the crankshaft 32 is pushed downwardly from the vertical position of the section A.

The section B represents a vertical groove which interconnects the sections A, C.

The section D is positioned at an end of the section C, and has a downward groove 32f for receiving the control pin 37 when the crankshaft 32 is released from a push in the LOCK position. When the control pin 37 is received in the groove 32f, the crankshaft 32 cannot be turned unless pushed downwardly. Stated otherwise, the key K has to be pushed in and turned for unlocking the handle 6. The position of the control pin 37 shown in FIG. 7 is assumed when the key K is pushed in when it is in the LOCK position, i.e., it is the position shown in FIG. 5.

FIGS. 8(*a*) and 8(*b*) are cross-sectional views illustrative of the action of an engaging portion of the handle lock device 16, the views showing the insertion of an object into the handle lock device 16 at the time the handle 6 is locked.

Figures 8A, 8B:
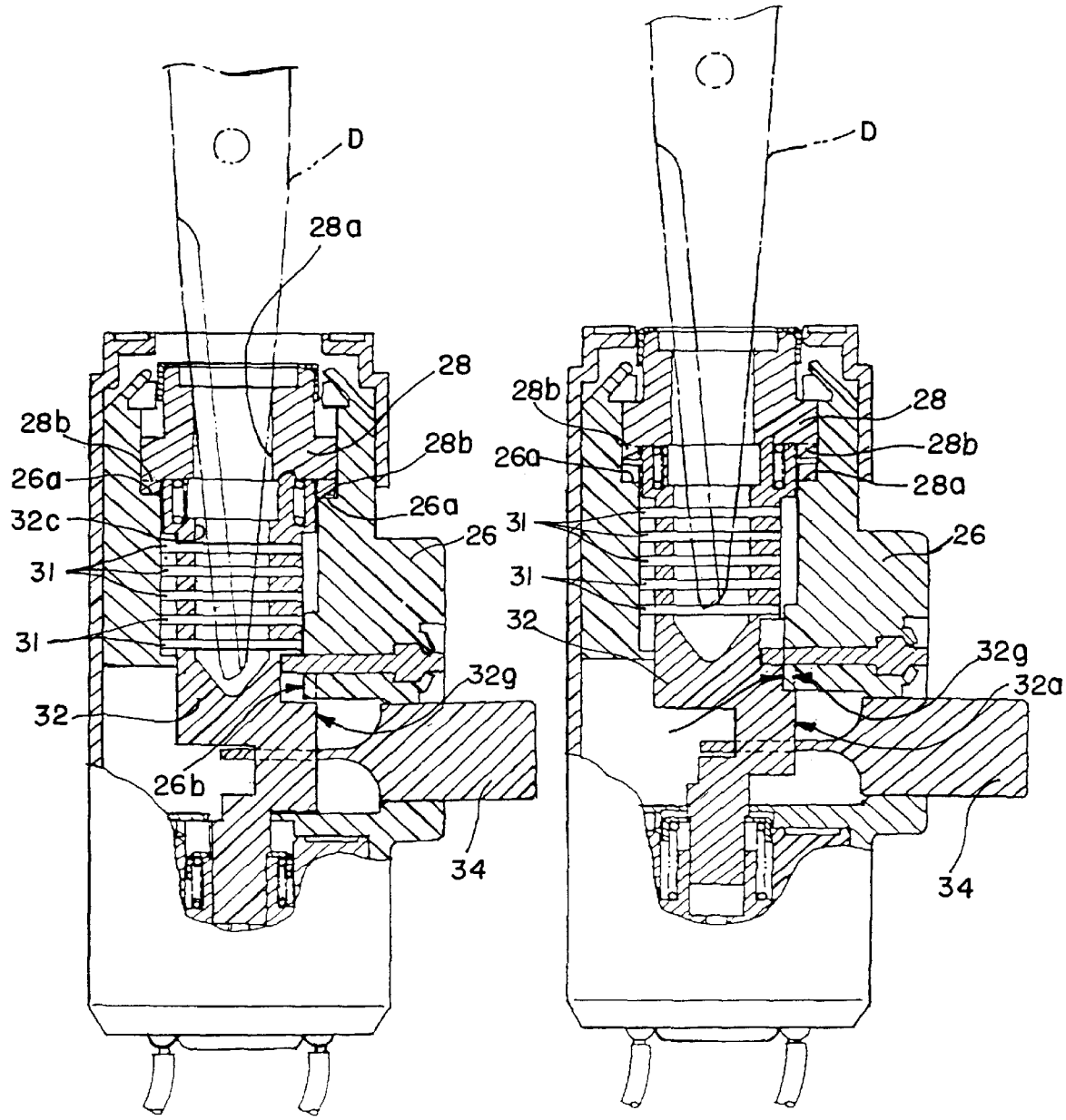
FIG. 8(a) is a cross-sectional view illustrative of the action of an engaging portion of the handle lock device.
FIG. 8(b) is a cross-sectional view illustrative of the action of an engaging portion of the handle lock device.

In FIG. 8(a), if an object D such as scissors, a screwdriver, or the like is inserted and pushed into the keyhole 28a and the key insertion hole 32c and attempts are made to turn the object D when the handle 6 is locked, then the protector block 28 is also pushed in, forcing the teeth 28b on the lower surface thereof into the recesses 26a that are defined in the outer lock cylinder 26. Therefore, the protector block 28 cannot be turned.

Since the key K is not inserted, the tumblers 31 project from the crankshaft 32, preventing the crankshaft 32 from being turned with respect to the outer lock cylinder 26. Both the protector block 28 and the tumblers 31, therefore, serve to prevent the crankshaft 32 from being turned, so that the handle 6 will not be unlocked by the object D.

If the inserted object D shown in FIG. 8(a) is pulled out or the key K is inserted but not pushed in, then the protector block 28 does not engage the outer lock cylinder 26 as shown in FIG. 8(b). At this time, however, an engaging surface 32g of an upper portion of the crank portion 32a engages a lower protrusion 26b of the outer lock cylinder 26, preventing the crankshaft 32 from being turned. The engaging surface 32g and the protrusion 26b are also shown in FIG. 6. While the crank portion 32a has the engaging surface 32g as an engaging portion, the crank portion 32a may not have the engaging surface 32g, but may itself serve as an engaging portion insofar as it can engage the protrusion 26b of the outer lock cylinder 26. Furthermore, as is the case with the condition shown in FIG. 8(a), the crankshaft 32 is prevented from being turned with respect to the outer lock cylinder 26 by the tumblers 31. Therefore, both the crankshaft 32 itself and the tumblers 31 serve to prevent the crankshaft 32 from being turned, so that the handle 6 will not be unlocked. The handle lock device according to the preset invention is not limited to use on the motorcycle in the illustrated embodiment, but may be used on three and fourwheeled motor vehicles, electric vehicles, working vehicles, etc.

The present invention offers the following advantages due to the illustrated arrangement. In the handle lock device according to claim 1, the protector block is normally urged to move in the direction in which the key can be pulled out of the key insertion hole and the keyhole, and is movable in the direction in which the key can be inserted through the keyhole into the key insertion hole. The protector block includes the engaging portion for engaging the outer lock cylinder when pushed in. When an object in place of a key is inserted into the key insertion hole and attempts are made to forcibly turn the object while pushing the object, the engaging portion of the protector block engages the outer lock cylinder, and the protector block cannot be turned. In combination with the tumblers preventing the crankshaft from being turned, the above structure makes it difficult to unlock the handle lock device. Since the engaging portion can be provided through a small modification on a lower portion of the protector block, any increase in the cost is minimized.

In the handle lock device according to claim 2, the crank portion of the crankshaft has the engaging portion disengageable from the outer lock cylinder when pushed in. When attempts are made to turn an inserted object while pulling the object, the engaging portion of the crank portion of the crankshaft engages the outer lock cylinder, and the crankshaft cannot be turned. In combination with the tumblers preventing the crankshaft from being turned, the above structure makes it difficult to unlock the handle lock device. Because the crank portion for projecting and retracting the lock pin is used to engage the outer lock cylinder, any modification of the configuration of the crankshaft is minimized, and hence any increase in the cost is minimized.

In the handle lock device, the protector block is movable in the direction in which the key can be inserted through the keyhole into the key insertion hole, the protector block and the outer lock cylinder having therebetween the first engaging portions engageable when the protector block is pushed in. The crankshaft is movable in the direction in which the key can be inserted through the keyhole into the key insertion hole. The crankshaft and the outer lock cylinder include therebetween the second engaging portions disengageable when the crankshaft is pushed in. When an object in place of a key is inserted into the key insertion hole and attempts are made to forcibly turn the object while pushing the object, the first engaging portions between the protector block and the outer lock cylinder engage each other, preventing the crankshaft from being turned. When attempts are made to turn an inserted object while pulling the object, the second engaging portions between the crankshaft and the outer lock cylinder engage each other, preventing the crankshaft from being turned. In combination with the tumblers preventing the crankshaft from being turned, the above structure makes it highly difficult to unlock the handle lock device. This is preferable from the standpoint of crime prevention.

In the handle lock device according to claim 4, the engaging portion of the protector block extends in the axial direction thereof. Therefore, the protector block is not large in size in the radial direction. Since the handle lock device does not increase in size, the vehicle base is not required to be modified for attachment of the handle lock device, and any increase in the cost is minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A handle lock device comprising:
    an outer lock cylinder for attaching to a vehicle base;
    a crankshaft for projecting and retracting a lock pin, said crankshaft including a linear portion supporting tumblers mounted retractable therein; and
    a protector block having a keyhole defined therein, the crankshaft and the protector block being arranged axially spaced in series with each other and housed in the outer lock cylinder, the protector block mounted for axial movement between outward and inward positions;
    a key insertion hole defined in an end of the linear portion of said crankshaft, the tumblers being retracted by inserting a key through the keyhole in the protector block into the key insertion hole;
    means for urging said protector block axially outward, said protector block having an engaging portion for engaging the outer lock cylinder when the protector block is moved axially inward.

2. The handle lock device according to claim 1, wherein when said protector block is axially displaced said engaging portion disposed on one side of said protector block engages with a mating surface on said outer lock cylinder to prevent rotation therebetween.

3. The handle lock device according to claim 2, wherein said engaging portion includes teeth disposed on said one side of said protector block and corresponding teeth disposed on said mating surface on said outer lock cylinder.

4. A handle lock device having an outer lock cylinder for attaching to a vehicle base comprising:

a crankshaft having a crank portion for projecting and retracting a lock pin, the crankshaft mounted for axial movement between outward and inward positions;

a protector block having a keyhole defined therein, the crankshaft and the protector block being arranged in series with each other and housed in the outer lock cylinder, the crankshaft having a linear portion supporting tumblers mounted retractable therein, the protector block mounted for axial movement between outward and inward positions; and a key insertion hole defined in an end of the linear portion, the tumblers being retracted by inserting a key through the keyhole in the protector block into the key insertion hole;

said crank portion of the crankshaft including an engaging portion disengageable from the outer lock cylinder when the crankshaft is moved axially inward.

5. The handle lock device according to claim 4, wherein when said crank portion is axially displaced in a key removal direction, said engaging portion disposed on said crank portion engages with a mating surface on said outer lock cylinder to prevent rotation therebetween.

6. The handle lock device according to claim 4, wherein said engaging portion includes a protrusion disposed thereon and a corresponding engaging surface on said outer lock cylinder.

7. A handle lock device having an outer lock cylinder for attaching to a vehicle base comprising:

a crankshaft for projecting and retracting a lock pin, the crankshaft mounted for axial movement between outward and inward positions;

a protector block having a keyhole defined therein, the protector block mounted for axial movement between outward and inward positions, the crankshaft and the protector block being arranged in series with each other and housed in the outer lock cylinder, the crankshaft having a linear portion supporting tumblers retractably mounted therein and a key insertion hole defined in an end of the linear portion, the tumblers being retracted by inserting a key through the keyhole in the protector block into the key insertion hole;

said protector block and said outer lock cylinder having therebetween first engaging portions engageable when the protector block is moved axially inward, said crankshaft and said outer lock cylinder having therebetween second engaging portions disengageable when the crankshaft is moved axially inward.

8. The handle lock device according to claim 7, wherein said engaging portion of the protector block extends in an axial direction thereof.

9. A handle lock device comprising:

an outer lock cylinder for attaching to a vehicle base;

a crankshaft for projecting and retracting a lock pin, said crankshaft including a linear portion supporting tumblers mounted retractable therein; and a protector block having a keyhole defined therein, the crankshaft and the protector block being arranged axially spaced in series with each other and housed in the outer lock cylinder, the protector block mounted for axial movement between outward and inward positions;

a key insertion hole defined in an end of the linear portion of said crankshaft;

means for urging said protector block axially outward, said protector block having an engaging portion for engaging the outer lock cylinder when moved axially inward, wherein the unauthorized entry of an object into the keyhole and the key insertion hole prevents the tumblers from being retracted.

10. The handle lock device according to claim 9, wherein when said protector block is axially displaced said engaging portion disposed on one side of said protector block engages with a mating surface on said outer lock cylinder to prevent rotation therebetween.

11. The handle lock device according to claim 10, wherein said engaging portion includes teeth disposed on said one side of said protector block and corresponding teeth disposed on said mating surface on said outer lock cylinder.

12. A handle lock device having an outer lock cylinder for attaching to a vehicle base comprising:

a crankshaft having a crank portion for projecting and retracting a lock pin, the crankshaft mounted for axial movement between outward and inward positions;

a protector block having a keyhole defined therein, the crankshaft and the protector block being arranged in series with each other and housed in the outer lock cylinder, the crankshaft having a linear portion supporting tumblers mounted retractable therein, the protector block mounted for axial movement; and a key insertion hole defined in an end of the linear portion;

said crank portion of the crankshaft includes an engaging portion disengageable from the outer lock cylinder when the crankshaft is moved axially inward, wherein the unauthorized entry of an object into the keyhole and the key insertion hole prevents the tumblers from being retracted.

13. The handle lock device according to claim 12, wherein when said crank portion is axially displaced in a key removal direction, the engaging portion disposed on said crank portion engages with a mating surface on said outer lock cylinder to prevent rotation therebetween.

14. The handle lock device according to claim 12, wherein said engaging portion includes a protrusion disposed thereon and a corresponding engaging surface on said outer lock cylinder.

15. A handle lock device having an outer lock cylinder for attaching to a vehicle base comprising:

a crankshaft for projecting and retracting a lock pin, the crankshaft mounted for axial movement between outward and inward positions;

a protector block having a keyhole defined therein, the crankshaft and the protector block being arranged in series with each other and housed in the outer lock cylinder, the crankshaft having a linear portion supporting tumblers mounted retractably therein and a key insertion hole defined in an end of the linear portion, the protector block mounted for axial movement between outward and inward positions;

said protector block and said outer lock cylinder having therebetween first engaging portions engageable when the protector block is moved axially inward, said crankshaft and said outer lock cylinder having therebetween second engaging portions disengageable when the crankshaft is moved axially inward, wherein the unauthorized entry of an object into the keyhole and the key insertion hole prevents the tumblers from being retracted.

16. The handle lock device according to claim 15, wherein said first engaging portion of the protector block extends in an axial direction thereof.

\* \* \* \* \*